United States Patent [19]

Watanabe et al.

[11] Patent Number: 5,350,826

[45] Date of Patent: Sep. 27, 1994

[54] EPOXY RESIN COMPOSITION CONTAINING A POLYAMINOAMIDE AND A LATENT CURING AGENT FOR FIBER IMPREGNATION

[75] Inventors: Osamu Watanabe, Saitama; Makoto Takezawa, Niiza, both of Japan

[73] Assignee: Tonen Corporation, Japan

[21] Appl. No.: 982,722

[22] Filed: Nov. 27, 1992

[30] Foreign Application Priority Data

Nov. 29, 1991 [JP] Japan ................................ 3-342253

[51] Int. Cl.$^5$ ............................................ C08G 65/10
[52] U.S. Cl. ........................................ 528/93; 528/99; 528/103; 528/113; 525/423; 525/510; 525/935
[58] Field of Search .................... 528/103, 93, 99, 113; 525/423, 510, 935

[56] References Cited

U.S. PATENT DOCUMENTS

| | | | |
|---|---|---|---|
| 4,129,670 | 12/1978 | Riew | 528/113 |
| 4,214,067 | 7/1980 | Packer | 528/109 |
| 4,298,656 | 11/1981 | Mendelsohn | 528/103 |
| 4,525,571 | 6/1985 | Burba et al. | 528/103 |
| 4,657,986 | 4/1987 | Isayama et al. | 528/27 |
| 4,874,833 | 10/1989 | Kershaw | 528/90 |
| 4,981,728 | 1/1991 | Homma et al. | 528/27 |
| 5,011,721 | 4/1991 | Decker et al. | 428/36.9 |

FOREIGN PATENT DOCUMENTS 0436944 12/1990 European Pat. Off. .

*Primary Examiner*—Melvyn I. Marquis
*Assistant Examiner*—Randy Gulakowski
*Attorney, Agent, or Firm*—Lorusso & Loud

[57] ABSTRACT

An epoxy resin composition for forming prepregs is disclosed which includes an epoxy resin having at least two epoxy groups, a latent curing agent for the epoxy resin in an amount of 0.5–3.0 equivalents per equivalent of the epoxy groups of the epoxy resin, and a reactive, viscosity-increasing agent in an amount of 0.2–3.0 parts by weight per 100 parts by weight of the epoxy resin. The epoxy resin composition has an initial viscosity $n_{I(50)}$ at 50° C. of 1,000–200,000 cP and an initial viscosity $n_{I(23)}$ at 23° C. of at least 10,000 cP.

5 Claims, 1 Drawing Sheet

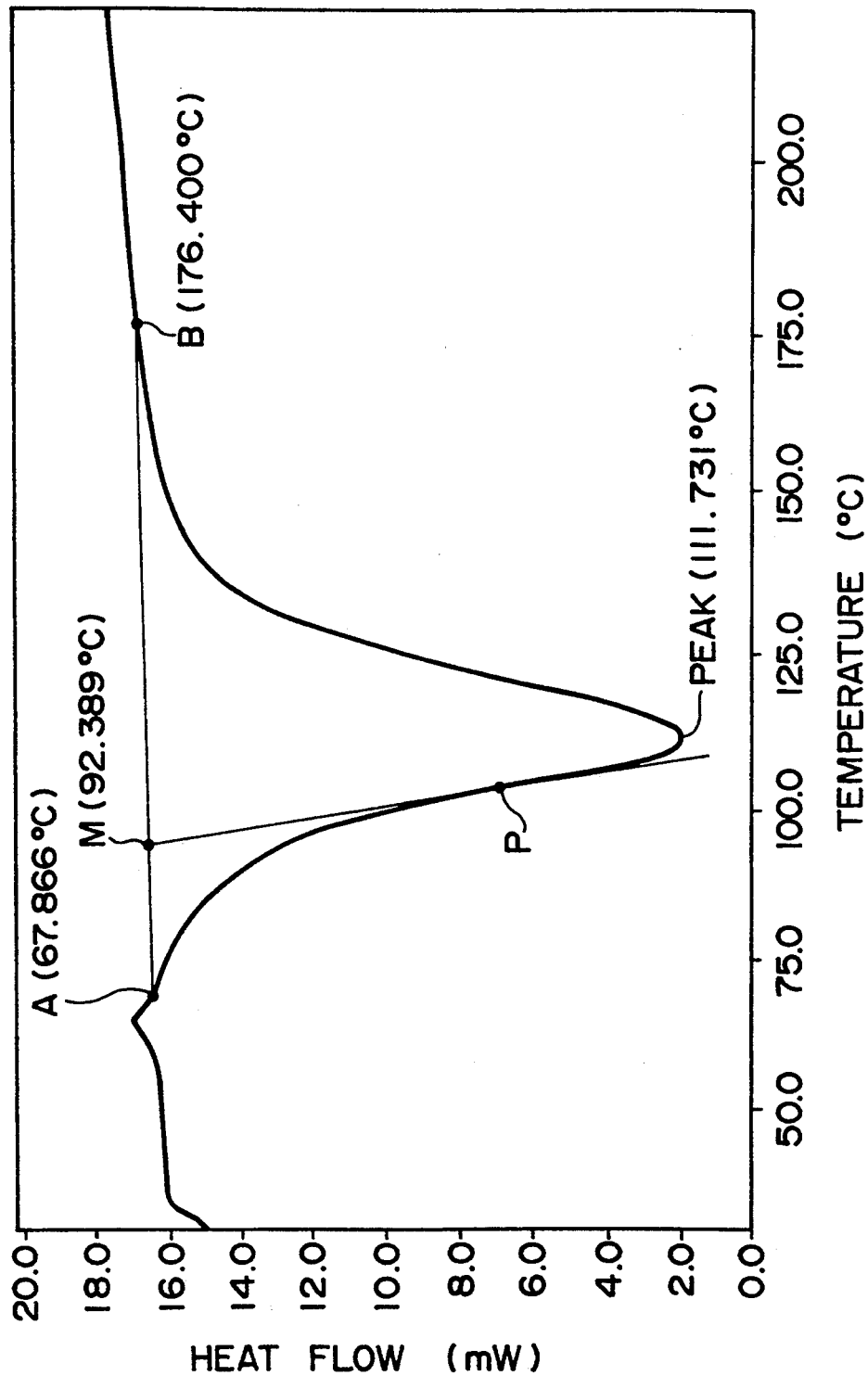

EPOXY RESIN COMPOSITION CONTAINING A POLYAMINOAMIDE AND A LATENT CURING AGENT FOR FIBER IMPREGNATION

BACKGROUND OF THE INVENTION

This invention relates to an epoxy resin composition useful for forming a resin matrix of a prepreg and to a prepreg for forming fiber-reinforced composite articles. The present invention is also directed to a process for the production of such a prepreg.

Prepregs using reinforcing fibers such as aramide fibers, glass fibers and carbon fibers are utilized for the production of various fiber-reinforced composite articles such as golf club shafts, fishing rods, tennis racket frames and skis. As a resin matrix for such prepregs, an epoxy resin is generally used because it gives a cured body having excellent modulus of elasticity, hardness and resistance to heat and chemicals.

As epoxy resin compositions for forming prepregs, there are known a solvent type composition in which a solvent is used for adjusting the viscosity of the composition to a suitable range, a low viscosity type composition which contains no solvent but exhibits suitable fluidity for impregnation at room temperature, and a hot-melt type composition which contains no solvent but exhibits suitable fluidity for impregnation at an elevated temperature.

The solvent type composition has a drawback that the solvent remaining in the prepreg obtained therefrom adversely affects the properties and workability of the prepreg. The low viscosity type composition (typical of which is disclosed in U.S. Pat. No. 5,011,721) has a problem because it is difficult to impregnate a reinforcing fiber layer homogeneously with the composition and because the viscosity of the composition should be increased so extensively (for example, from 1,000 cP to 100,000 cP) that the properties of the prepreg products become non-uniform.

The hot-melt type composition has an advantage because it allows the production of prepregs by various desired methods so that homogeneous impregnation of a fiber layer with the composition is attainable. However, conventional prepregs using the hot-melt type composition require relatively severe conditions, for example, 130° C. for 2 hours, for hardening. This is not only economically disadvantageous but also restricts the scope of utilization of the prepregs. To cope with this problem, prepregs capable of being hardened at about 100° C. have been proposed. Such prepregs using a hot-melt type composition, however, are unstable so that the properties of the prepregs are apt to change during storage.

SUMMARY OF THE INVENTION

It is, therefore, an object of the present invention to provide an epoxy resin composition suitable for forming prepregs.

Another object of the present invention is to provide an epoxy resin composition which is useful as a matrix resin for prepregs, which exhibits excellent hardenability and which is easy to handle during impregnation and hardening.

It is a special object of the present invention to provide a prepreg which is stable and which is easy to handle during processing into shaped, hardened composite bodies.

It is a further object of the present invention to provide a method which permits the production of prepregs in which a reinforcing fiber layer is homogeneously impregnated with the above-mentioned epoxy resin composition.

In accordance with one aspect of the present invention there is provided an epoxy resin composition comprising:

an epoxy resin having at least two epoxy groups;
a latent curing agent for said epoxy resin in an amount of 0.5–3.0 equivalents per equivalent of the epoxy groups of said epoxy resin; and
a reactive, viscosity-increasing agent in an amount of 0.2–3.0 parts by weight per 100 parts by weight of said epoxy resin, said epoxy resin composition having an initial viscosity $n_{I(50)}$ at 50° C. of 1,000–200,000 cP and an initial viscosity $n_{I(23)}$ at 23° C. of at least 10,000 cP.

In another aspect, the present invention provides a prepreg comprising a layer of a reinforcing fiber impregnated with the above epoxy resin composition.

The present invention also provides a process for the production of a prepreg, comprising the steps of:

applying a coating of the above epoxy resin composition on a surface of a base sheet to form a coating of said epoxy resin composition on said base sheet;
covering said coating with a cover film to obtain a layered sheet in which said coating is sandwiched between said base sheet and said cover film;
winding said layered sheet into a roll;
unwinding said roll while removing said cover film from said layered sheet;
providing a layer of reinforcing fibers;
overlaying said unwound sheet on at least one side of said reinforcing fiber layer with said coating being in direct contact with the surface of said reinforcing fiber layer to obtain a laminate;
heating said laminate at a temperature of 50°–70° C. so that said reinforcing fiber layer is impregnated with said epoxy resin composition.

Since the epoxy resin composition has an initial viscosity $n_{I(23)}$ at 23° C. of at least 10,000 cP (centipoise), the cover film may be easily peeled off from the layered sheet. The initial viscosity $n_{I(23)}$ at 23° C. is preferably at least 50,000 cP.

The impregnation of the reinforcing fiber layer is effected at 50°–70° C. Since the reinforcing fiber layer is uniformly overlaid with the epoxy resin composition layer of the sheet and since the epoxy resin composition has an initial viscosity $n_{I(50)}$ at 50° C. of 1,000–200,000 cP, the impregnation can be performed smoothly and homogeneously without difficulty. Preferably, the initial viscosity $n_{I(50)}$ at 50° C. is 5,000–150,000 cP.

It is preferred that the epoxy resin composition should exhibit a viscosity at 50° C. of no more than 50 times the initial viscosity $n_{I(50)}$, generally 50,000–1,500,000 cP, when maintained at 23° C. for 7 days after the preparation of the composition. By this, the prepreg is very easy to handle during the formation of composite articles and can still exhibit satisfactory hardenability. Further, the prepreg is stable and has good shelf life. When the viscosity of the epoxy resin composition after being allowed to stand at 23° C. for 7 days exceeds $50 \times (n_{I(50)})$, namely when the viscosity increase is too fast, then the properties of prepregs will become non-uniform.

BRIEF DESCRIPTION OF THE DRAWINGS

Other objects, features and advantages of the present invention will become apparent from the detailed description of the preferred embodiments of the invention which follows, when considered in light of the accompanying drawing, in which:

FIG. 1 is a DSC curve measured on a commercially available, latent curing agent and explanatory of determination of the reaction initiating temperature thereof.

DETAILED DESCRIPTION OF THE PREFERRED EMBODIMENTS OF THE INVENTION

The epoxy resin to be used in the present invention has at least two epoxy groups and may be, for example, glycidyl ether-type epoxy resins such as diglycidyl ethers of bisphenol A, brominated bisphenol A, bisphenol F or bisphenol S; novolak epoxy resins such as phenol novolak epoxy resins and cresol novolak epoxy resins; glycidyl ester-type epoxy resins; alicyclic epoxy resins; glycidylamine-type epoxy resins such as tetraglycidyldiaminodiphenylmethane and triglycidyl-p-aminophenol; and heterocyclic epoxy resins. These epoxy resins may be used singly or in combination of two or more.

Any latent curing agent may be used for the purpose of the present invention. The term "latent curing agent" used herein is intended to refer to a curing agent which is substantially non-reactive with the epoxy resin at room temperature but reacts with the epoxy resin at an elevated temperature. It is preferred that the latent curing agent can start reacting with the epoxy resin at a temperature of less than 120° C. Examples of suitable latent curing agents include an amine curing agent obtained by reaction of an amine (such as disclosed in JP-A-3-177418) with an epoxy resin and urea; and an encapsulated curing agent containing an amine (such as disclosed in JP-A-64-70523) as core material.

The use of a latent curing agent which has a reaction initiation temperature $T_{onset}$ of in the range of 40°–115° C. is particularly preferred. The term "reaction initiating temperature" used herein is intended to refer to on set temperature determined from DSC curve obtained with a differential scan calorimeter operated at a heating rate of 10° C. per minute. With reference to FIG. 1, for example, the on set temperature is the temperature of the point M at which the tangential line on the inflection point P of the curve of the reaction heat peak crosses the line extending between the both end points A and B of the peak.

A latent curing agent having a reaction initiation temperature $T_{onset}$ of, for example, 92° C. appreciably reacts with the epoxy resin at 92° C. or higher. At a temperature below 92° C. the reaction can occur, but the reaction rate becomes lower as the temperature decreases. Substantially no reaction occurs at 23° C. (room temperature).

The latent curing agent is used in an amount of 0.5–3.0 equivalents, preferably 0.7–2.5 equivalents, per one equivalent of the epoxy groups of the epoxy resin.

The reactive viscosity-increasing agent to be used in the present invention is a compound which can gradually react with the epoxy resin at room temperature to increase the viscosity of the composition. Preferably, the reactive viscosity-increasing agent is such as to increase the viscosity of the composition having an initial viscosity $n_{J(50)}$ at 50° C. of 1,000–200,000 cP to 50,000–1,500,000 cP at 50° C., more preferably 100,000–1,000,000, when maintained at 23° C. for 7 days.

Examples of the reactive viscosity-increasing agents include aromatic diamines and polyaminoamides. Illustrative of suitable aromatic diamines are metaphenylenediamine, diaminodiphenylmethane, diaminodiphenylsulfone and diaminodiethyldiphenylmethane. A polyaminoamide is a compound having a plurality of active amino groups and at least one amide group and obtained by condensation of a polyamine with a polycarboxylic acid. The polyamine may be, for example, ethylenediamine, diethylenetriamine, triethylenetetramine, tetraethylenepentamine, pentaethylenehexamine or the like polyethylenepolyamine. As the polycarboxylic acid, there may be mentioned polymers of naturally occurring unsaturated fatty acids, short chain dibasic acids, aromatic diabasic acids, epoxydized unsaturated fatty acids and alkenylsuccinic acids. Such polyaminoamides are commercially available as, for example, TOMIDE 210, 215X, 225X, 235X and 245 (products of Fuji Kasei K. K.), VERSAMID 100, 115, 125 and 140 (products of Henkel-Hakusuisha Inc.) and LACQUAMIDE N-153, TD966 and 973 (products of Dainippon Ink Ltd.).

It is important that the reactive viscosity-increasing agent should be used in an amount of 0.2–3.0 parts by weight, preferably 0.5–2.0 parts by weight, per 100 parts by weight of the epoxy resin. An amount of the viscosity-increasing agent below 0.2 part by weight is insufficient to increase the viscosity of the composition to a desired level. On the other hand, too large an amount of the agent in excess of 3.0 parts by weight causes rapid increase in viscosity of the composition so that the prepreg becomes difficult to shape into desired structures.

The epoxy resin composition can contain one or more additives, as desired. Illustrative of additives are a filler, a coloring agent and a diluent. It is preferred that a nitrile rubber and/or a silane coupling agent having as a functional group an amino group, a glycidoxy group or an epoxidized cycloalkyl group be incorporated into the epoxy resin composition for reasons of improving the adhesion between the resin matrix and the reinforcing fibers.

The nitrile rubber may be, for example, an acrylonitrile-butadiene rubber, a carboxyl-terminated acrylonitrile-butadiene rubber, a cross-linked acrylonitrile-butadiene rubber or carboxyl-terminated, epoxidized acrylonitrile-butadiene rubber and preferably has an average particle size of 0.5–5 μm. The amount of the nitrile rubber is preferably 0.5–15 parts by weight, more preferably 1–10 parts by weight per 100 parts by weight of the epoxy resin.

The silane coupling agent may be, for example, β-(3,4-epoxycyclohexyl)ethyltrimethoxysilane, γ-glycidoxypropyltrimethoxysilane, γ-aminopropyltriethoxysilane or N-β-(aminoethyl)-γ-aminopropyltrimethoxysilane and is preferably used in an amount of 0.3–3.0 parts by weight, more preferably 0.5–2.0 parts by weight, per 100 parts by weight of the epoxy resin.

The epoxy resin composition may be prepared by any suitable known method. For example, epoxy resins are mixed with each other with heating to obtain a blend. After cooling to about 40° C., the blend is mixed with a curing agent and other additives to obtain a desired composition.

The epoxy resin composition according to the present invention is particularly suited for the production of prepregs in which a layer of reinforcing fibers is impregnated with the epoxy resin composition. As the reinforcing fibers, there may be used glass fibers, carbon fibers, asbestos, mica, synthetic resin fibers and woven or non-woven fabrics thereof. The content of the reinforcing fibers in the prepreg is generally 20–70% by weight.

In one preferred embodiment, the prepregs are produced in the following manner. The epoxy resin composition is first applied over a surface of a base sheet to form a coating of the epoxy resin composition on the base sheet. The coating on the base sheet is covered with a cover film to obtain a layered sheet in which the coating is sandwiched between the base sheet and the cover film. The layered sheet is then wound into a roll. The roll may be stored or may be immediately used for the production of a prepreg. In use, the roll is unwound while removing the cover film from the layered sheet. The unwound sheet is superposed on at least one side of a layer of reinforcing fibers with the coating thereof being in direct contact with the surface of the reinforcing fiber layer to obtain a laminate. The resulting laminate is then heated at a temperature of 50°–70° C. so that the reinforcing fiber layer is impregnated with the epoxy resin composition. The impregnation is preferably effected by passing the laminate through a nip of heated rollers. The base sheet is peeled off to leave the prepreg according to the present invention. The removal of the base sheet may be deferred until the prepreg is actually used for the fabrication of a fiber-reinforced composite article.

The following examples will further illustrate the present invention. Parts are by weight.

EXAMPLE 1

An epoxy resin composition having the composition shown below was prepared:

| Ingredient | Content |
| --- | --- |
| Epikote 828 (Bisphenol A epoxy resin manufactured by Yuka-Shell Epoxy Inc.) | 60 parts |
| Epikote 1001 (Bisphenol A epoxy resin manufactured by Yuka-Shell Epoxy Inc.) | 40 parts |
| Curing agent (FXE-1000 manufactured by Fuji Kasei K. K., reaction initiating temperature: about 92 °C., DSC curve: shown in FIG. 1) | 20 parts* |
| Diaminodiphenylmethane (reactive viscosity-increasing agent) | 2 parts |

*The amount of the curing agent is one equivalent per equivalent of the epoxy groups of the mixed epoxy resin (Epikote 828 and 1001).

The epoxy resin composition immediately after the preparation showed viscosity (initial viscosity) of 830,000 cP at 23° C., 167,000 cP at 40° C., 37,700 cP at 50° C. and 12,500 cP at 60° C. When allowed to stand at 23° C. for 7 days, the epoxy resin composition showed viscosity of 1,200,000 cP at 40° C., 195,000 cP at 50° C. and 72,000 cP at 60° C. (unable to measure at 23° C.). Thus, the composition shows a viscosity at 50° C. of about 5.2 times (195,000/37,700) that of the initial viscosity at 50° C. when allowed to stand at 23° C. for 7 days.

The epoxy resin composition as prepared was applied on a surface of a releasing paper at 55° C. to obtain a coated paper. The coating was covered with a polyethylene film and the resulting three layered sheet was wound into a roll. The layered sheet was unwound while peeling the polyethylene cover film. A layer of unidirectionally oriented glass fibers (specified as E glass fiber, manufactured by Asahi Fiber Glass K. K.) was sandwiched between two sheets of the above unwound sheet such that the coating layer of each sheet is in direct contact with the surface of the glass fiber layer. The resulting laminate was then passed through a nip of heated rollers at 55° C. to obtain a prepreg. After the releasing papers on both surfaces of the prepreg had been removed, the prepreg was stored at room temperature for 60 days while occasionally testing the surface tackiness thereof. The results of the tackiness test were as summarized in Table 1.

TABLE 1

| Storage Time (day) | 0* | 1 | 2 | 3 | 7 | 14 | 30 | 60 |
| --- | --- | --- | --- | --- | --- | --- | --- | --- |
| Tackiness | bad | bad | bad | no good | good | good | good | good |

*immediately after the preparation

The prepreg stored for 60 day was cured under two different conditions and then tested for the degree of curing by differential scanning calorimeter (DSC-7 manufactured by Perkin Elmer Inc.). The results are shown in Table 2.

TABLE 2

| Conditions | | Degree of Curing |
| --- | --- | --- |
| Time (hour) | Temperature (°C.) | (%) |
| 5 | 70 | 95 |
| 0.5 | 90 | 90 |

COMPARATIVE EXAMPLE 1

An epoxy resin composition having the composition shown below was prepared:

| Ingredient | Content |
| --- | --- |
| Epikote 828 | 60 parts |
| Epikote 1001 | 40 parts |
| Curing agent (FXE-1000) | 20 parts |

The epoxy resin composition immediately after the preparation showed viscosity (initial viscosity) of 720,000 cP at 23° C. and 36,000 cP at 50° C. When allowed to stand at 23° C. for 7 days, the epoxy resin composition showed viscosity of 720,000 cP at 23° C. and 36,500 cP at 50° C. Using this epoxy resin composition, a prepreg was prepared in the same manner as that in Example. Tackiness test revealed the results summarized in Table 3.

TABLE 3

| Storage Time (day) | 0 | 1 | 2 | 3 | 7 | 14 | 30 | 60 |
| --- | --- | --- | --- | --- | --- | --- | --- | --- |
| Tackiness | bad | bad | bad | bad | bad | bad | bad | bad |

The prepreg stored for 60 day showed curing characteristics similar to that of Example 1.

COMPARATIVE EXAMPLE 2

An epoxy resin composition having the composition shown below was prepared:

| Ingredient | Content |
| --- | --- |
| Epikote 828 | 70 parts |
| Epikote 1001 | 30 parts |
| Curing agent (FXE-1000) | 20 parts* |
| Diaminodiphenylmethane | 15 parts |

*The amount of the curing agent is 0.9 equivalent per equivalent of the epoxy groups of the mixed epoxy resin (Epikote 828 and 1001).

The epoxy resin composition immediately after the preparation showed viscosity (initial viscosity) of 34,000 cP at 50° C. and 720,000 cP at 23° C. When allowed to stand at 23° C. for 7 days, the epoxy resin composition was hardened and the viscosity at 50° C. was not able to be measured. Using this epoxy resin composition, a prepreg was prepared in the same manner as that in Example. Tackiness test revealed that the prepreg immediately after the preparation causes difficulty in handling because of tackiness. The prepreg when stored for 1 day also causes difficulty in handling because of excess hardening.

EXAMPLE 2

An epoxy resin composition having the composition shown below was prepared:

| Ingredient | Content |
| --- | --- |
| Epikote 828 | 40 parts |
| Epikote 1001 | 60 parts |
| Curing agent (HX-3722 manufactured by Asahi Kasei K. K., reaction initiating temperature: about 112 ° C.) | 30 parts* |
| Diaminodiphenylmethane | 1 part |

*The amount of the curing agent is one equivalent per equivalent of the epoxy groups of the mixed epoxy resin (Epikote 828 and 1001).

The epoxy resin composition immediately after the preparation showed viscosity (initial viscosity) of 1,200,000 cP at 23° C. and 65,000 cP at 50° C. When allowed to stand at 23° C. for 7 days, the epoxy resin composition showed viscosity of 148,000 cP at 50° C. (unable to measure at 23° C.).

Using the above epoxy resin composition a prepreg was prepared in the same manner as that in Example 1 except that the coating temperature and the impregnation temperature were each increased to 65° C. The prepreg was tested for tackiness and hardenability in the same manner as that in Example 1 to give the results shown in Tables 4 and 5.

TABLE 4

| Storage Time (day) | 0 | 1 | 2 | 3 | 7 | 14 | 30 | 60 |
| --- | --- | --- | --- | --- | --- | --- | --- | --- |
| Tackiness | bad | bad | no good | no good | good | good | good | good |

TABLE 5

| Conditions | | Degree of Curing |
| --- | --- | --- |
| Time (hour) | Temperature (°C.) | (%) |
| 1 | 90 | 90 |
| ½ | 110 | 95 |

EXAMPLE 3

An epoxy resin composition having the composition shown below was prepared:

| Ingredient | Content |
| --- | --- |
| Epikote 828 | 40 parts |
| Epikote 1001 | 60 parts |
| Curing agent (HX-3722, reaction initiating temperature: about 112 ° C.) | 30 parts |
| Polyaminoimide (Tomide 235A manufactured by Fuji Kasei K. K.) | 1 part |

The epoxy resin composition immediately after the preparation showed viscosity (initial viscosity) of 1,400,000 cP at 23° C. and 64,000 cP at 50° C. When allowed to stand at 23° C. for 7 days, the epoxy resin composition showed viscosity of 200,000 cP at 50° C. (unable to measure at 23° C.).

using the above epoxy resin composition a prepreg was prepared in the same manner as that in Example 2. The prepreg was tested for tackiness and hardenability in the same manner as that in Example 1 to give the same results as those in Example 2.

COMPARATIVE EXAMPLE 3

An epoxy resin composition having the composition shown below was prepared:

| Ingredient | Content |
| --- | --- |
| Epikote 828 | 45 parts |
| Epikote 1001 | 55 parts |
| Curing agent (HX-3722, reaction initiating temperature: about 112 °C.) | 30 parts |
| Dicyandiamide | 2 parts |

The epoxy resin composition immediately after the preparation showed viscosity (initial viscosity) of 960,000 cP at 23° C. and 44,500 cP at 50° C. When allowed to stand at 23° C. for 7 days, the epoxy resin composition showed viscosity of 45,000 cP at 50° C. and 980,000 cP at 23° C.

Using the above epoxy resin composition a prepreg was prepared in the same manner as that in Example 1 except that the coating temperature and the impregnation temperature were each increased to 65° C. The prepreg was tested for tackiness and hardenability in the same manner as that in Example 2 to give the results shown in Tables 6 and 7.

TABLE 6

| Storage Time (day) | 0 | 1 | 2 | 3 | 7 | 14 | 30 | 60 |
| --- | --- | --- | --- | --- | --- | --- | --- | --- |
| Tackiness | bad | bad | bad | bad | bad | bad | bad | bad |

TABLE 7

| Conditions | | Degree of Curing |
| --- | --- | --- |
| Time (hour) | Temperature (°C.) | (%) |
| 1 | 90 | 90 |
| ½ | 110 | 95 |

EXAMPLE 4

An epoxy resin composition having the composition shown below was prepared:

| Ingredient | Content |
| --- | --- |
| Epikote 828 | 70 parts |
| Epikote 1001 | 30 parts |

-continued

| Ingredient | Content |
|---|---|
| Curing agent (FXE-1000, reaction initiating temperature: about 92 °C.) | 20 parts |
| Diaminodiphenylmethane | 3 parts |

The epoxy resin composition immediately after the preparation showed viscosity (initial viscosity) of 220,000 cP at 23° C. and 12,000 cP at 50° C. When allowed to stand at 23° C. for 7 days, the epoxy resin composition showed viscosity of 380,000 cP at 50° C. (unable to measure at 23° C.).

Using the above epoxy resin composition a prepreg was prepared in the same manner as that in Example 1. The prepreg was tested for tackiness and hardenability in the same manner as that in Example 1 to give the results shown in Tables 8 and 9.

TABLE 8

| Storage Time (day) | 0 | 1 | 2 | 3 | 7 | 14 | 30 | 60 |
|---|---|---|---|---|---|---|---|---|
| Tackiness | bad | no good | good | good | good | good | good | good |

TABLE 9

| Conditions | | Degree of Curing |
|---|---|---|
| Time (hour) | Temperature (°C.) | (%) |
| 1 | 90 | 85 |
| ½ | 110 | 93 |

EXAMPLE 5

An epoxy resin composition having the composition shown below was prepared:

| Ingredient | Content |
|---|---|
| Epikote 828 | 60 parts |
| Epikote 1001 | 40 parts |
| Curing agent (FXE-1000, reaction initiating temperature: about 92 °C.) | 20 parts |
| Polyaminoamide | 2 parts |

The epoxy resin composition immediately after the preparation showed viscosity (initial viscosity) of 830,000 cP at 23° C. and 36,000 cP at 50° C. When allowed to stand at 23° C. for 7 days, the epoxy resin composition showed viscosity of 400,000 cP at 50° C. (unable to measure at 23° C.).

Using the above epoxy resin composition a prepreg was prepared in the same manner as that in Example 1. The prepreg was tested for tackiness and hardenability in the same manner as that in Example 1 to give the results shown in Tables 10 and 11.

TABLE 10

| Storage Time (day) | 0 | 1 | 2 | 3 | 7 | 14 | 30 | 60 |
|---|---|---|---|---|---|---|---|---|
| Tackiness | bad | bad | no good | no good | good | good | good | good |

TABLE 11

| Conditions | | Degree of Curing |
|---|---|---|
| Time (hour) | Temperature (°C.) | (%) |
| 1 | 80 | 95 |

TABLE 11-continued

| Conditions | | Degree of Curing |
|---|---|---|
| Time (hour) | Temperature (°C.) | (%) |
| ½ | 110 | 100 |

COMPARATIVE EXAMPLE 4

An epoxy resin composition having the composition shown below was prepared:

| Ingredient | Content (% by weight) |
|---|---|
| Diglycidyl ether of bisphenol A (DER 383 manufactured by Dow Chemical Co.) | 72.76 |
| 1,4-Butanediol diglycidyl ether | 21.59 |
| Meta-phenylenediamine | 3.72 |
| Boron trifluoride monoethylamine | 1.86 |
| Salicylic acid | 0.07 |

The epoxy resin composition immediately after the preparation showed viscosity (initial viscosity) of 400 cP at 23° C. and 15 cP at 50° C. When allowed to stand at 23° C. for 7 days, the epoxy resin composition showed viscosity of 50,000 cP at 50° C. and 1,000,000 cP at 23° C.

The above epoxy resin composition was applied on a releasing paper and the coating was covered with a cover film in the same manner as that in Example 1. The cover film, however, was not able to be peeled off and the coating sticked on the cover film. It was impossible to prepare prepregs with the method described in Example 1. Thus, a layer of glass fibers used in Example 1 was dipped in the epoxy resin composition for the impregnation therewith. It was, however, difficult to impregnate the layer with a predetermined amount of the epoxy resin composition.

COMPARATIVE EXAMPLE 5

An epoxy resin composition having the composition shown below was prepared:

| Ingredient | Content |
|---|---|
| Epikote 828 | 60 parts |
| Epikote 1001 | 40 parts |
| Curing agent (FXE-1000, reaction initiating temperature: about 92 °C.) | 20 parts |
| Diaminodiphenylmethane | 0.1 part |

The epoxy resin composition immediately after the preparation showed viscosity (initial viscosity) of 600,000 cP at 23° C. and 35,500 cP at 50° C. When allowed to stand at 23° C. for 7 days, the epoxy resin composition showed viscosity of 37,000 cP at 50° C. and 620,000 cP at 23° C.

Using the above epoxy resin composition a prepreg was prepared in the same manner as that in Example 1. The prepreg was tested for tackiness in the same manner as that in Example 1 to give the results shown in Table 12.

TABLE 12

| Storage Time (day) | 0 | 1 | 2 | 3 | 7 | 14 | 30 | 60 |
|---|---|---|---|---|---|---|---|---|
| Tackiness | bad | bad | bad | bad | bad | bad | bad | bad |

COMPARATIVE EXAMPLE 6

An epoxy resin composition having the composition shown below was prepared:

| Ingredient | Content |
| --- | --- |
| Epikote 828 | 60 parts |
| Epikote 1001 | 40 parts |
| Curing agent (FXE-1000, reaction initiating temperature: about 92 °C.) | 20 parts |
| Diaminodiphenylmethane | 4 parts |

The epoxy resin composition immediately after the preparation showed viscosity (initial viscosity) of 730,000 cP at 23° C. and 38,000 cP at 50° C. When allowed to stand at 23° C. for 7 days, the epoxy resin composition was hardened and the viscosity was unable to be measured.

Using the above epoxy resin composition a prepreg was prepared in the same manner as that in Example 1. The prepreg was tested for tackiness in the same manner as that in Example 1 to give the results shown in Table 13.

TABLE 13

| Storage Time (day) | 0 | 1 | 2 | 3 | 7 | 14 | 30 | 60 |
| --- | --- | --- | --- | --- | --- | --- | --- | --- |
| Tackiness | bad | bad | good | bad | bad | bad | bad | bad |

COMPARATIVE EXAMPLE 7

An epoxy resin composition having the composition shown below was prepared:

| Ingredient | Content |
| --- | --- |
| Epikote 828 | 60 parts |
| Epikote 1001 | 40 parts |
| Curing agent (FXE-1000, reaction initiating temperature: about 92 °C.) | 20 parts |
| Diaminodiphenylmethane | 10 parts |

The epoxy resin composition immediately after the preparation showed viscosity (initial viscosity) of 940,000 cP at 23° C. and 42,000 cP at 50° C. When allowed to stand at 23° C. for 7 days, the epoxy resin composition was hardened and the viscosity was unable to be measured.

Using the above epoxy resin composition a prepreg was prepared in the same manner as that in Example 1. The prepreg was tested for tackiness in the same manner as that in Example 1 to give the results shown in Table 14.

TABLE 14

| Storage Time (day) | 0 | 1 | 2 | 3 | 7 | 14 | 30 | 60 |
| --- | --- | --- | --- | --- | --- | --- | --- | --- |
| Tackiness | bad | bad | bad | bad | bad | bad | bad | bad |

EXAMPLE 6

An epoxy resin composition having the composition shown below was prepared:

| Ingredient | Content |
| --- | --- |
| Epikote 828 | 60 parts |
| Epikote 1001 | 40 parts |
| Curing agent (FXE-1000, reaction initiating temperature: about 92 °C.) | 20 parts |
| Diaminodiphenylmethane | 2 parts |
| Carboxyl-terminated acrylonitrile butadiene rubber (Hycar CTBN 1300X8, manufactured by BF Goodrich Inc., acrylonitrile content: 17%) | 1 part |

Using the above epoxy resin composition, a prepreg was prepared in the same manner as that in Example 1. The prepreg was cut and cut prepreg sections were stacked to a thickness of 2 mm. The stacked prepregs were press-molded with a hot press machine at 90° C. for 20 minutes to obtain a hardened, molded composite body. The composite body had a bending strength of 138 kg/mm$^2$, a bending modulus of 3.9 ton/mm$^2$ and ILSS (ASTM D2344) of 6.9 kg/mm$^2$.

EXAMPLE 7

An epoxy resin composition having the composition shown below was prepared:

| Ingredient | Content |
| --- | --- |
| Epikote 828 | 60 parts |
| Epikote 1001 | 40 parts |
| Curing agent (FXE-1000, reaction initiating temperature: about 92 °C.) | 20 parts |
| Diaminodiphenylmethane | 2 parts |
| γ-Glycidoxypropyltrimethoxysilane | 1 part |

Using the above epoxy resin composition, a prepreg was prepared in the same manner as that in Example 1. The prepreg was cut and cut prepreg sections were stacked to a thickness of 2 mm. The stacked prepregs were press-molded with a hot press machine at 90° C. for 20 minutes to obtain a hardened, molded composite body. The composite body had a bending strength of 155 kg/mm$^2$, a bending modulus of 4.3 ton/mm$^2$ and ILSS (ASTM D2344) of 7.8 kg/mm$^2$.

What is claimed is:

1. An epoxy resin composition comprising:
   an epoxy resin having at least two epoxy groups;
   a latent curing agent for said epoxy resin in an amount of 0.5–3.0 equivalents per equivalent of the epoxy groups of said epoxy resin said latent curing agent having a reaction initiation temperature of 40°–115° C.; and
   a reactive, viscosity-increasing agent selected from the group consisting of aromatic diamines and polyaminoamides, said reactive, viscosity-increasing agent being present in an amount of 0.2–3.0 parts by weight per 100 parts by weight of said epoxy resin, said epoxy resin composition having an initial viscosity $n_f(50)$ at 50° C. of 1,000–200,000 cP and an initial viscosity $n_f(23)$ at 23° C. of at least 10,000 cP, said reactive viscosity-increasing agent serving to increase said initial viscosity $n_f(50)$ to 50,000–1,500,000 cP when maintained at 23° C. for 7 days, said composition exhibiting a viscosity at 50° C. of no more than 50 times the initial viscosity $n_f(50)$ when maintained at 23° C. for 7 days.

2. A composition as claimed in claim 1, further comprising a silane coupling agent having an epoxidized cycloalkane, a glycidoxy group or an amino group.

3. A composition as claimed in claim 1, further comprising a nitrile rubber.

4. A composition as claimed in claim 1, and exhibiting a viscosity at 50° C. of 50,000–1,500,000 when maintained at 23° C. for 7 days.

5. A prepreg comprising a layer of a reinforcing fiber impregnated with an epoxy resin composition according to claim 1.

* * * * *